UNITED STATES PATENT OFFICE.

SAMUEL S. WALES, OF MUNHALL, PENNSYLVANIA, ASSIGNOR TO CARNEGIE STEEL COMPANY, OF PITTSBURG, PENNSYLVANIA, A CORPORATION OF NEW JERSEY.

PROCESS FOR THE MANUFACTURE OF STEEL.

987,840.  Specification of Letters Patent.  Patented Mar. 28, 1911.

No Drawing.  Application filed December 11, 1908. Serial No. 466,938.

*To all whom it may concern:*

Be it known that I, SAMUEL S. WALES, of Munhall, in the county of Allegheny and State of Pennsylvania, have invented a new and useful Process for the Manufacture of Steel, of which the following is a specification.

In the practice of my invention I use a single furnace, provided with electrodes or other appliances of a known kind for the application of electrically generated heat to the charge, and I provide the furnace with gas ports and preferably with regenerators such as are used in open hearth furnaces or heating furnaces.

The furnace is provided with a refractory lining, and in the practice of my invention a charge of lime or limestone and iron oxid, and if desired a proportion of steel scrap, is introduced into the furnace and is heated with the gas flame to a high temperature near to the melting point. When this charge has been heated as above described, the gas is shut off from the furnace and a charge of molten pig iron is poured into it. A reaction at once ensues, the carbon being lowered and the phosphorus and silicon of the iron passing into the slag. The slag as formed is allowed to flow from the furnace through a suitable slag notch provided for that purpose at the proper level. At the completion of this violent reaction and after the removal of the bulk of the slag, which may occupy fifteen to thirty minutes, more or less, the carbons forming the electrodes are lowered and electrical heat is applied to the bath. New slag forming material is now added, and the treatment is continued with the application of electrical heat until the charge has been brought to the carbon content and desired condition for tapping. In this process the silicon and phosphorus are substantially removed at the preliminary stage and a large proportion of the carbon, the charge being proportioned so that the net carbon content of the bath at this stage is somewhat, though not greatly in excess of the percentage of carbon in the finished steel. The sulfur and free oxygen contained in the iron are removed in the application of the electrical heat.

The advantages of my invention are that it enables the manufacture of steel to be carried on with economy of time and electrical energy, and with very simple apparatus.

I claim:

1. An improvement in the manufacture of steel, which consists in introducing into a furnace a charge of fluxing material and iron oxid, heating the same with a gas flame, then shutting off the gas, pouring molten pig iron upon the heated body, removing the slag, adding new fluxing material, and converting the bath into finished steel with the application of electrical heat.

2. An improvement in the manufacture of steel which consists in heating a body of iron oxid and fluxing material in a regenerative open hearth furnace, pouring molten metal upon the heated iron oxid and fluxing material, then removing the slag resulting from the addition of the molten pig iron, adding new slag forming material to the bath in the furnace and then applying electrical heat to the bath in the furnace and completing the conversion of the bath into finished steel.

In testimony whereof, I have hereunto set my hand.

SAMUEL S. WALES.

Witnesses:
THOMAS W. BAKEWELL,
ANNA E. WALLACE.

Copies of this patent may be obtained for five cents each, by addressing the "Commissioner of Patents, Washington, D. C."